Aug. 13, 1957 A. W. KINGSTON 2,802,392
CINEMATOGRAPHIC FILM TRACTION APPARATUS
Filed Feb. 8, 1954 5 Sheets-Sheet 3
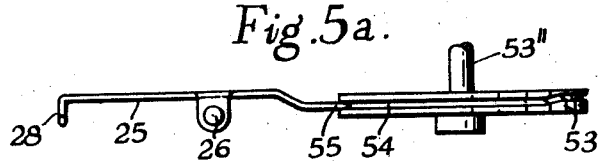
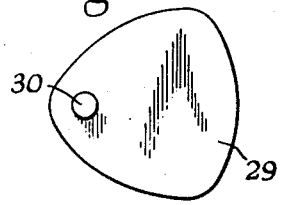
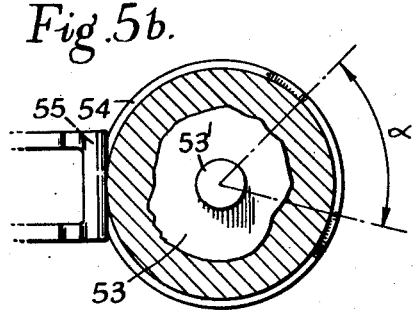
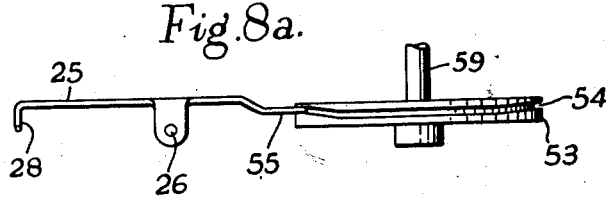
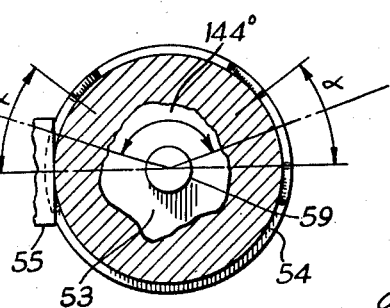
INVENTOR
Arthur W. Kingston
BY
Ralph B. Stewart
ATTORNEY Aug. 13, 1957  A. W. KINGSTON  2,802,392
CINEMATOGRAPHIC FILM TRACTION APPARATUS
Filed Feb. 8, 1954  5 Sheets-Sheet 4
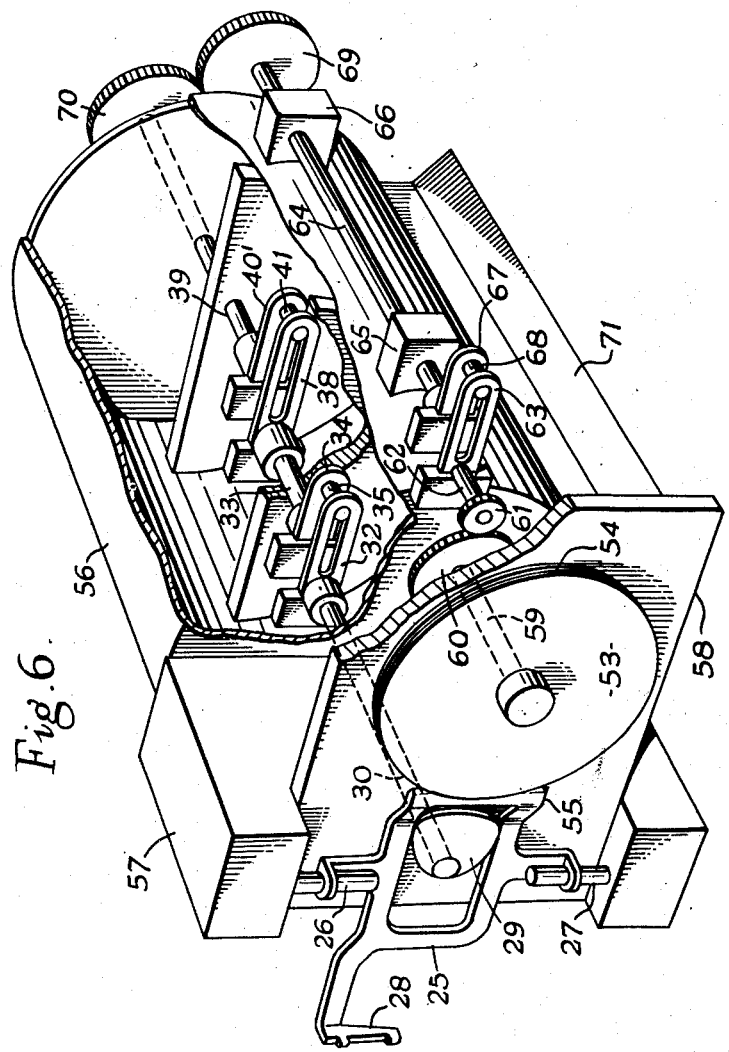
INVENTOR
Arthur W. Kingston
BY
Ralph D. Stewart
ATTORNEY Aug. 13, 1957 A. W. KINGSTON 2,802,392
CINEMATOGRAPHIC FILM TRACTION APPARATUS
Filed Feb. 8, 1954 5 Sheets-Sheet 5

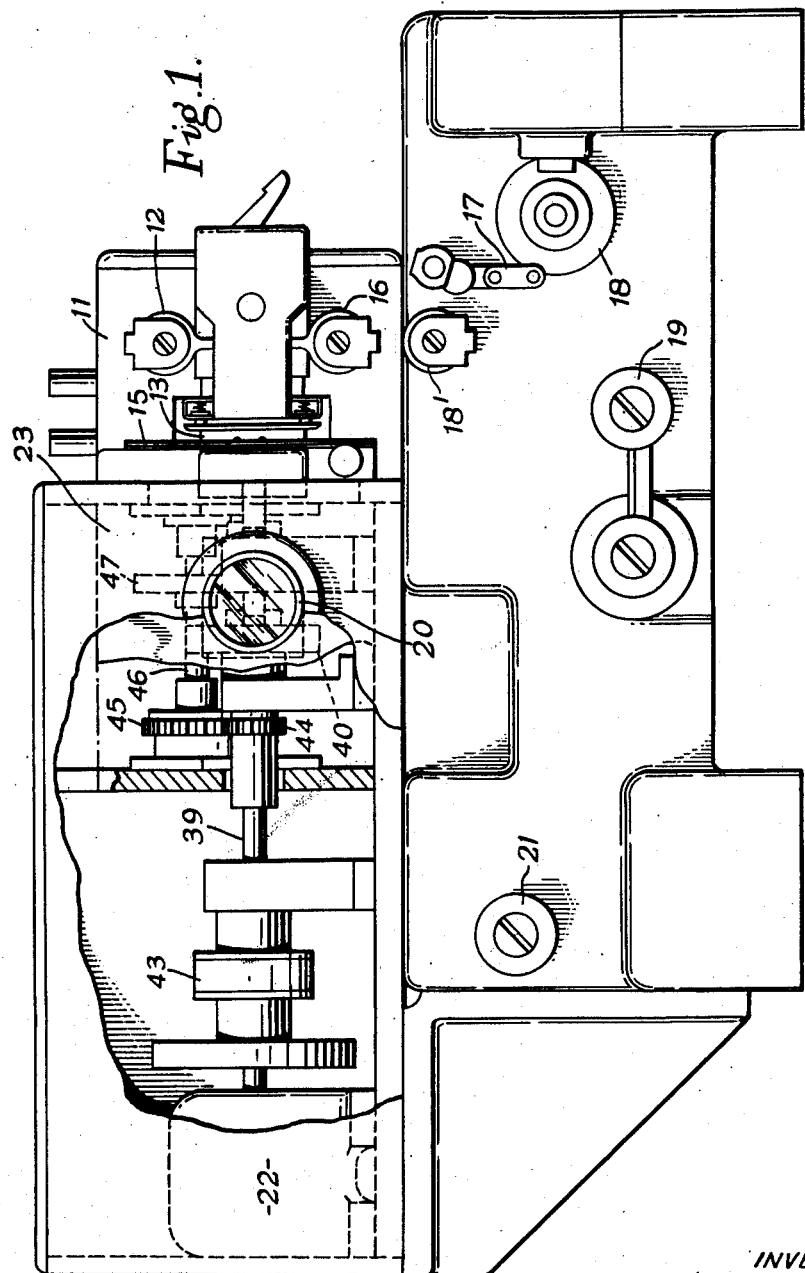

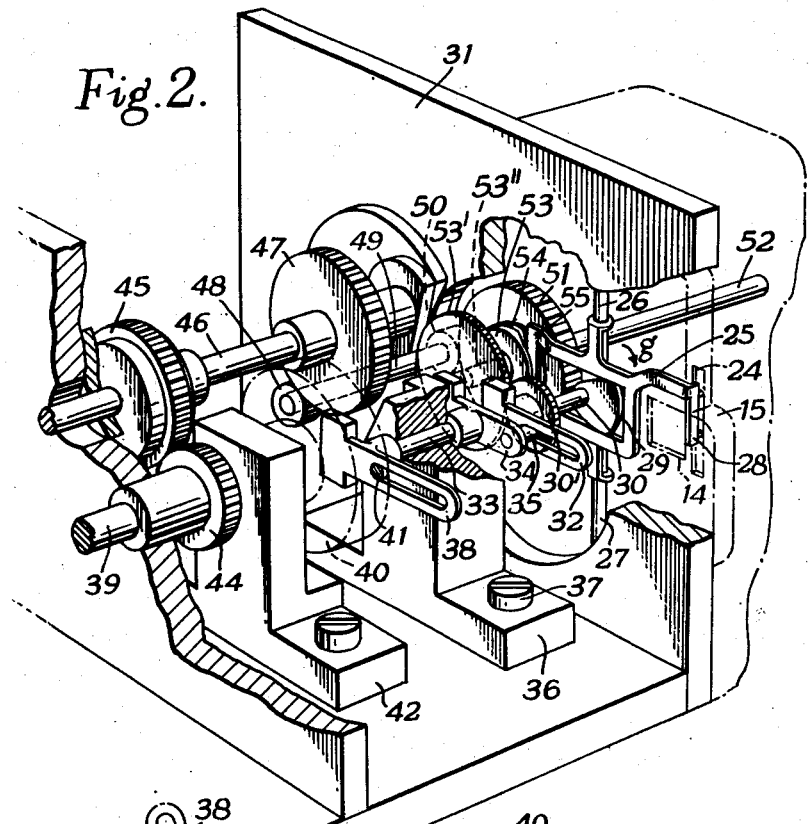
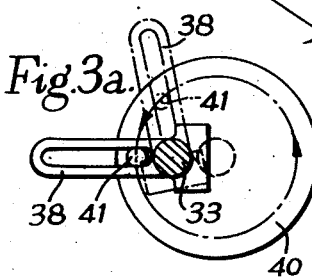
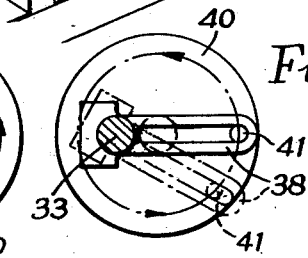
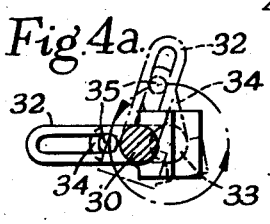
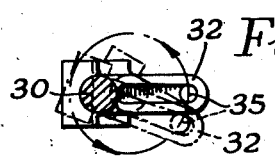

INVENTOR
Arthur W. Kingston
BY
Ralph B. Stewart
ATTORNEY

United States Patent Office 2,802,392
Patented Aug. 13, 1957

2,802,392

CINEMATOGRAPHIC FILM TRACTION APPARATUS

Arthur William Kingston, Denham, England, assignor to Marconi's Wireless Telegraph Company Limited, Chelmsford, England Application February 8, 1954, Serial No. 408,941

Claims priority, application Great Britain February 20, 1953

18 Claims. (Cl. 88—18.4)

The present invention relates to cinematographic film traction apparatus of the type comprising a film feed device adapted to feed cinematographic film through a film gate with a step-by-step motion such that, in succession, each frame of the film enters the gate, remains in the gate for a predetermined interval of time, and then leaves the gate to be replaced by the next frame, the film feed device including a film engaging member adapted, in operation, to engage the film and driving means to cause the film engaging member to move the film through the gate with the said step-by-step motion. By "frame" is meant a part of the film upon which a picture is to be recorded or has been recorded, as the case may be, the part being one of a plurality of such parts along the length of the film at spaced intervals.

The film feed device commonly used is of the type in which the driving means comprises reciprocating means including a driving member for imparting a reciprocatory motion to the film engaging member, and engaging and disengaging means including a driving member for moving the film engaging member into and out of engagement with the film, the two motions being so related to one another that, in operation, the film engaging member when brought into engagement with the film moves the film in the desired direction through the film gate.

Apparatus of the type referred to above employing such a film feed device is widely used in the projection of motion-picture films on to a screen for direct viewing by an audience.

Apparatus of the type specified has also been employed, in conjunction with television transmitting apparatus, in the television transmission of motion picture films. For this purpose, a light scanning beam is focused on to the film in a film gate of the apparatus and through the film on to a photoelectric cell. The light beam is caused repeatedly to scan the film in the gate in a manner well known in the art. In the television transmission of motion-picture films as carried out in Great Britain, the light scanning beam is arranged to make 50 scans per second, but since a method of interlaced horizontal scanning is employed in which the scanning beam is made to scan alternate horizontal lines of the picture during one scan and complete the scan by scanning the remaining unscanned lines of the picture during the next scan, a complete scan hereinafter referred to as a frame scan, is made at only half this rate, that is to say, at a rate of 25 frame scans per second. In order to synchronise the appearance of the frames of the film in the film gate with the frame scan times of the scanning beam, the film-traction apparatus is arranged to feed film through the gate at the rate of 25 frames per second, which is one frame per second faster than the standard rate in motion practice. In this way, the scanning beam is able to make one complete frame scan between successive feed movements of the film through the projector gate.

It has been found, however, that unless the film pull-down interval, that is to say, the time taken to replace one frame in the film gate by the next, can be made at least as short as the time between the end of one scan by the beam and the beginning of the next, movement of the film in the gate will be televised causing blurring of the top or bottom, or both top and bottom, of the televised picture. If a shutter is employed to cut off projection during movement of the film, only alternate lines at the top or bottom or both top and bottom of the televised picture are transmitted. Such distortions of the televised picture are objectionable.

The principal object of the present invention is to provide in cinematographic film traction apparatus of the type specified means whereby the distortions above referred to can be reduced.

According to the present invention, a cinematographic film-traction apparatus of the kind specified comprises a coupling device including a driving and a driven member, the driving member being coupled to the driven member in such a manner that the driving member when moving at constant speed moves the driven member at a speed which varies continuously between a maximum and a minimum value, the driven member being coupled to the driving means of the film feed device in such a manner that the driven member when moving at maximum speed is in a position to cause the film engaging member of the film feed device to move the film in the film gate.

According to a feature of the invention a further coupling device is provided, including a driving and a driven member, the driving member of the further device being coupled to the driven member thereof in such a manner that the driving member of the further device when moving at constant speed moves the driven member of the further coupling device at a speed which varies continuously between a maximum and a minimum value, the driven member of the further device being coupled to the driving member of the first-mentioned coupling device in such a manner that the driven member of the said further device moves the driving member of the first-mentioned device at maximum speed when the latter member is in a position to move the driven member of the first-mentioned coupling device at substantially maximum speed.

If the driving means of the film feed device is of the kind adapted to be driven by rotatable means, the driven member of the first-mentioned coupling device may be mounted for rotation and an provided with an elongated guide part extending in a general direction radially of the axis of rotation thereof, and the driving member of the first-mentioned device may be mounted for rotation about an axis parallel to but displaced from the axis rotation of the driven member of the first-mentioned device and have mounted thereon at a predetermined distance from the axis of rotation thereof a follower part which engages with and is constrained to move along the guide part of the driven member. The further coupling device may also be of this structure.

The predetermined distance between the axis of rotation of the driving member of such a coupling device and the follower part thereon is preferably greater than the distance between the axes of rotation of the driving and driven members of the device, whereby continuous rotation of the driven member can be obtained.

Where the film feed device is of the type specified the first-mentioned coupling device may be coupled to the driving member of the reciprocating means and an auxiliary coupling device of the same kind may be provided for driving the engaging and disengaging means, the driven member of the auxiliary coupling device being coupled to the driving member of the engaging and disengaging means in such a manner that the driven member of the auxiliary device moves the driving member of the engaging and disengaging means at maximum speed when the latter member is in a position to cause the film engaging member to engage the film.

Some embodiments of the invention will now be described by way of example with reference to the accompanying drawings in which Fig. 1 is a general view of a cinematographic film projection apparatus according to this invention, Fig. 2 is a perspective view of the apparatus shown in Fig. 1, in which parts of the cover and supports are shown cut away to reveal the film traction apparatus in detail.

Figs. 3a and 4a show the relative positions of the driving and driven members of the two coupling devices viewed from the front of the projection apparatus shown in Fig. 2, just before the position of maximum speed is reached, and Figs. 3b and 4b show the relative positions of the driving and driven members of the two coupling devices viewed from the front of the projection apparatus shown in Fig. 2, just before the position of minimum speed is reached.

Figs. 5a and 5b show a side elevation and a plan view of the film engaging member and the engaging and disengaging means of the apparatus shown in Fig. 2.

Fig. 6 shows an assembly of apparatus according to the invention which can be fitted to a cinematographic film projection apparatus as a detachable unit.

Fig. 7 is a plan view of a cam suitable for use in the apparatus shown in Figs. 2 and 6.

Figs. 8a and 8b show a side elevation and plan view of the film engaging member and the engaging and disengaging means of the assembly shown in Fig. 6.

Figure 9:
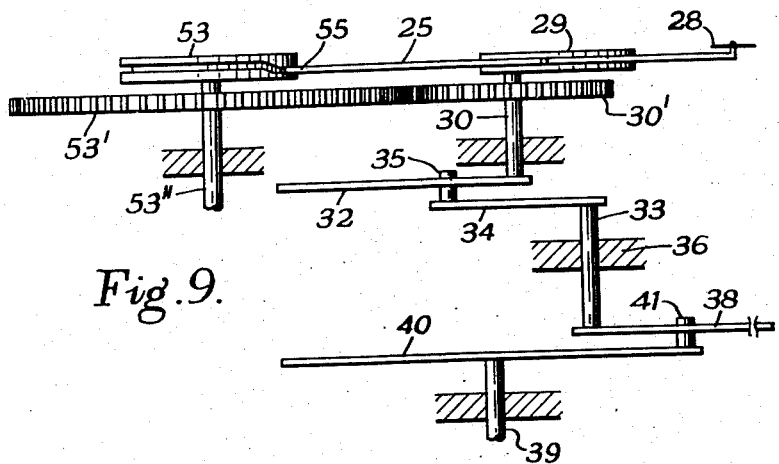
Fig. 9 is a diagrammatic plan view of another embodiment of the invention.

Fig. 1 shows a cinematographic film projection apparatus 11 of conventional design which has been modified to incorporate film-traction apparatus according to this invention. Cinematographic film is passed in known manner under a sprocket 12 along a film path 13 in front of a rectangular aperture 14 (not shown) in a plate 15, over a sprocket 16, and roller 17, around roller 18, over sprocket 18′ under roller 19 and guide roller 21 and is wound up on a take-up spool (not shown). A synchronous motor 22 is provided for driving the various parts of the projection apparatus including the film-traction apparatus shown in dotted line at 23 in Fig. 1 and described in detail with reference to Fig. 2.

Referring now to Fig. 2, the rectangular aperture 14 constituting the film gate is shown in dotted line. Cinematographic film passes in front of the aperture 14 in such a way that the sprocket holes in the film pass in front of and along a vertical rectangular slit 24 formed in a plate 15 alongside the aperture 14.

A film engaging member 25 in the form of a hollow rectangular metal frame is mounted for rocking and sliding movement on vertical guide pins 26 and 27. The size of the frame and the disposition of the pins 26 and 27 are such that a projecting part 28 of the frame, hereinafter referred to as the claw 28, passes into the slit 24.

A cam having a shape approximating that of the sector of a circle is fixedly mounted in the region of the apex on the end of a camshaft 30 projecting through and rotatably mounted in a supporting face plate 31 carried by the frame of the apparatus. On the other end of the camshaft 30 is fixedly mounted a radially extending arm 32 having a radial slit therein. A driving shaft 33 parallel to but offset from the camshaft 30 carries on one end a driving arm 34 which extends radially therefrom and which carries a pin 35 projecting horizontally from its free end in the opposite direction to that of the shaft 33. The driving shaft 33 is rotatably mounted on a support 36, adjustably fixed by a screw 37 to the frame of the projector. The position of the driving shaft 33 and the driving arm 34 in relation to the camshaft 30 is made such that the pin 35 engages in the slit in the arm 32.

The other end of the shaft 33 carries a radially extending arm 38 having a radially extending slit formed therein. A further driving shaft 39 parallel to but offset from the shaft 33 has fixedly mounted on the end adjacent the arm 38 a disc 40 (shown in broken line) which carries a pin 41 projecting horizontally from a point in the region of the circumference of the disc in the direction of the arm 38. The relative positions of the two shafts 39 and 33 and the position of the pin 41 on the disc 40 is such that the pin engages in the arm 38. The shaft 39 is rotatably mounted on a support 42 fixed to the frame of the apparatus and is driven by the motor 22 (as shown in Fig. 1) through a resilient coupling 43.

The driving shaft 39 is coupled through reduction gears 44 and 45 to an auxiliary driving shaft 46 which is drivably connected through gears 47 and 48, a shaft 49 and gears 50 and 51 to a further shaft 52 used for driving the sprockets 12 and 16 and the sprocket 18′.

A camwheel 53 having a peripheral groove 54 therein is fixedly mounted on one end of a shaft 53″ (shown dotted) which passes through the plate 31. The shaft 53″ is drivably connected to the camshaft 30 through reduction gears 30′ and 53′. The gears 30′ and 53′ have a reduction ratio of 1:2.

A cam follower part 55 of the film engaging member 25 engages in the groove 54, and in conjunction therewith provides a means for rocking the film engaging member 25 about the guide pins 26 and 27 to cause the claw 28 alternately to engage and disengage the sprocket holes in the film on the other side of the plate 15.

The camwheel 53 and the film engaging member is shown in detail in Figs. 5a and 5b. The groove 54 in the rim of the camwheel 53 is displaced laterally of the rim over a region shown in Fig. 5b by the angle $\alpha$ which is subtends.

In operation, the motor 22 is run at constant speed at 50 revolutions per second. The shaft 39 which is driven by the motor 22 through the coupling 43 rotates the disc 40 at constant angular speed. The pin 41 mounted on the disc 40 being constrained to move in the slit in the arm 38 causes the latter to rotate with an angular speed which varies continuously between a maximum and minimum value and which is dependent upon the angular position of the pin 41. Two angular positions of the pin 41 are shown in Figs. 3a and 3b. The position shown in broken line in Fig. 3a is that position just before the position of maximum speed is reached which is shown in full line. The position shown in broken line in Fig. 3b is that position just before the position of minimum speed is reached, the position of minimum speed being shown in full line. Thus it will be apparent that the shaft 33 is caused to rotate with continuously varying angular velocity and is rotating at maximum speed when the position shown in Fig. 2 is reached.

The arm 34 on the other end of the shaft 33 rotates with the shaft 33 and the pin 35 mounted on the arm 34 being constrained to move in the slit in the arm 32 causes the arm 32 on the camshaft 30 to rotate with a continuously varying angular velocity. Two angular positions of the pin 35 are shown in Figs. 4a and 4b. The position shown in broken line in Fig. 4a is that position just before the position of maximum speed is reached, the position of maximum speed being shown in full line. The position shown in broken line in Fig. 4b is the position just before the position of minimum speed is reached, the position of minimum speed being shown in full line. It will be seen from Fig. 2 that the pin 35 is arranged to be in a position to move the arm 32 with maximum speed when the pin 41 is in a position to move the arm 38 at maximum speed. To illustrate this Figs. 3a and 4a taken together show corresponding positions of the pin 35 and arm 32 and the pin 41 and arm 38 at and near their positions of maximum speed, and Figs. 3b and 4b taken together show corresponding positions of the two couplings at and near the positions of minimum speed.

The cam 29 which is mounted on the other end of the shaft 30 rotates with the same continuously varying angular velocity imparted to the shaft 30 by the arm 32, and as shown in Fig. 2 is arranged to move the film engaging member 25 in a downward direction for a direction of rotation indicated by the arrow g when its maximum angular speed is reached. Thus, by means of the cam 29 a reciprocatory motion is imparted to the film engaging member 25 in which downward movements are made at relatively high speed and upward movements at relatively low speed. The number of revolutions which the cam 29 makes in one second is of course 50.

The camwheel 53 which is driven by the camshaft 30 through reduction gears 30' and 53' makes one revolution for every two revolutions of the cam 29, and by rocking the film engaging member 25 about the guide pins 26 and 27 causes the claw 28 to engage the film for a period during each revolution of the camwheel. The arrangement is made such that the rocking of the film engaging member 25 coincides with downward movements thereof imparted to it by the cam 29. It will be apparent, however, that since the camwheel 53 makes only 25 revolutions per second, the claw 28 is caused to engage the film only during every alternate downward movement of the film engaging member 25. The film is thus fed through the film gate 14 at the rate of 25 frames per second.

The apparatus shown in Fig. 1 can be employed in conjunction with television transmission apparatus operating at 25 frame scans per second for televising pictures recorded on cinematographic film. A "flying spot" scanner is placed in front of the projection apparatus shown in Fig. 1 and a photocell (not shown) is mounted in front of the window 20. The light scanning beam from the scanner passes through the film in the film gate, is deflected through 90° towards the window 20 by a deflecting prism (not shown) located behind the window 20, passes through the window 20 and impinges on the photo-cell.

It will be apparent that alternatively the cam 29 could be rotated at 25 revolutions per second and the claw 28 caused to engage the film during each downward movement of the film engaging member. The advantage of the arrangement described is that the pull-down interval is halved by doubling the speed of rotation of the cam 29, the rate of feeding film through the film gate, however, remaining at 25 frames per second.

An assembly according to this invention which can be detachably mounted on a cinematograph projection apparatus and when faulty replaced by another such assembly and which is adapted to impart an irregular step-by-step motion of the film is shown in Fig. 6.

Irregular step-by-step motion of the film is necessary if the apparatus is to be employed in the television transmission of motion-picture film in which the television apparatus has a frame-scans rate of 30 frams scans per second as is the case in Canada and the U. S. A. It will be appreciated that it is not possible to increase the film projection rate to 30 frames per second without making the motion in the picture appear unnatural. This difficulty can however be overcome by making the time between successive film movements alternately ½₀ sec. and ⅒₀ sec. so that the average projection rate of the film remains at 24 frames per second. During the interval of ½₀ second, the scanning beam of the television apparatus makes 3 scans, that is to say, 1½ frame-scans, and during the interval ⅒₀ second the scanning beam makes one complete frame scan. The assembly described with reference to Fig. 6 is adapted to give such an irregular step-by-step motion of the film by arranging that the film engaging member 25 carrying the claw 28 makes 60 pull-down movements per second, but is operative in pulling the film down every first and fourth downward movement in each successive five downward movements of the member 25. This can, for example, be achieved by substituting the camwheel 53 shown in Fig. 2 which imparts rocking movement to the film engaging member 25 by a camwheel having a groove along its rim which is displaced laterally of the rim over two regions which divide the circumference of the camwheel in the ratio of 2 : 3. Such a camwheel when rotated at 12 revolutions per second can be arranged to cause the claw 28 of the film engaging member 25 to engage the film during the first and fourth downward movements in every five successive downward movements of the film engaging member 25. The film is thereby moved through the film gate with an irregular step-by-step motion at the average rate of 24 frames per second.

Referring now to Fig. 6, the parts of the assembly corresponding to those which are shown in and described with reference to Fig. 2 and operate in the same manner have been given the same reference numerals and will not be described further. The camshaft 30, the arm 32, the driving shaft 33 carrying the driving arm 34 and the arm 38, and the shaft 39 carrying an arm 40' corresponding to the disc 40 in the apparatus shown in Fig. 2 are contained in a cylindrical oil bath 56. The cam 29 is mounted on the end of the camshaft 30 which projects through an end piece 57 and an end plate 58, and engages with the film engaging member 25 in the manner hereinbefore described.

The follower part 55 of the film engaging member 26 engages in the groove 54 in the rim of a camwheel 53 which is mounted on the end of a shaft 59 which projects through the end plate 58. The shaft 59 is drivably connected through gears 60 and 61 to a shaft 62 rotatably mounted in a support (not shown) fixed to the oil bath 56. On the end of the shaft 62 is fixedly mounted an arm 63 extending radially from the shaft. The arm 63 has a radially extending slit formed therein. A driving shaft 64 porallel to but offset from the shaft 62 is rotatably mounted in supports 65 and 66 fixed to the oil bath 56. On the shaft 64 adjacent the arm 63 is fixedly mounted a radially extending arm 67 carrying a pin 68 which engages in the slit in the arm 63. The other end of the shaft 64 is drivably connected to the shaft 39 through gears 69 and 70.

The camwheel 53 is of the kind shown in Figs. 8a and 8b. The groove 54 in the rim of the camwheel 53 is displaced laterally of the rim over two regions indicated by the angles α, and these regions are so disposed that their centre lines divide the circumference of the camwheel 53 in the ratio 2:3.

The whole assembly is detachably mounted by sliding engagement of the base 71 in a mounting of dovetail cross-section rigidly fixed to the base plate of the projection apparatus. The shaft 39 is coupled through a resilient coupling to the driving shaft of a synchronous motor mounted on the projection apparatus.

An auxiliary drive is provided for driving the sprockets 12 and 16 and the sprocket 18'.

In operation the motor is run at a constant speed of 60 revolutions per second. The shaft 39 which is driven by the motor rotates the arm 40' at this constant speed. The pin 41 mounted on the arm 40' and engaging in the slit in the arm 38 causes the arm 38 to rotate with a speed which varies continuously between a maximum and minimum value as hereinbefore described. The shaft 33 carrying the arm 38 rotates with the arm 38 and drives the arm 34. The pin 35 mounted on the arm 34 and engaging the slit in the arm 32 causes the arm 32 to rotate with a speed which varies continuously between a maximum and a minimum value also in the manner hereinbefore described. The camshaft 30 carrying the arm 32 rotates with the arm 32 and drives the cam 29. It will readily be apparent that although the cam 29 rotates at a continuously varying angular velocity it nevertheless makes one revolution for every revolution of the shaft 39 and thus makes 60 revolutions per second.

The shaft 64 is driven at a constant speed of 60 revolutions per second from the shaft 39 through the gears 69 and 70. The arm 67 mounted on the end of the shaft 64 rotates with the shaft 64 and the pin 68 mounted thereon and engaging in the slit in the arm 63 causes the arm 63 to rotate at a speed which varies continuously between a maximum and minimum value. The shaft 62 carrying the arm 63 rotates with the shaft 63 at this varying speed. The shaft 59 carrying the camwheel 53 is driven by the shaft 62 through the gears 60 and 61 which have a reduction ratio of 1:5. The camwheel 53 thus makes twelve revolutions per second, its motion during each revolution being one in which the speed increases from a minimum value to a maximum value and then decreases again to a minimum value five times during each revolution.

The arrangement is made such that the camwheel 53 is moving at maximum speed when the follower part 55 of the film engaging member 25 is in the displaced parts of the groove 54 in the rim of the camwheel 53. By this means, the length of time for which the claw 28 engages the film is reduced without the need for reducing the lengths of the displaced parts of the groove 54.

The film engaging member 25 being driven by the cam 29 is caused to make five downward movements during one revolution of the camwheel 53. The arrangement is made such that the rocking of the film engaging member 25 when the follower part 55 engages the displaced portions of the groove 54 coincides with downward movements of the film engaging member 25. The claw 28 is thus made to engage the film during the first and fourth downward movements of the film engaging member 25 in each successive five downward movements, and the film thereby caused to move through the film gate with an irregular step-by-step motion, every alternate frame remaining in the gate for ½₀ sec. and the intermediate frames remaining in the gate for 1/30 sec.

The embodiments hereinbefore described may be modified in a variety of ways. For example, although in the apparatus described with reference to Fig. 2 the camwheel 53 is arranged to make one revolution for every two revolutions of the cam 29 in order that the apparatus can be operated at twice the normal speed and so further reduce the pull-down time, for some purposes this may not be necessary.

In an alternative arrangement, the camwheel 53 can be arranged to make one revolution for every revolution of the cam 29, so that the claw 28 is brought into engagement with the film during each downward movement of the film-engaging member 25 instead of every alternate downward movement. The apparatus may then be operated at normal speed.

It is to be noted that each of the radially extending arms in the apparatus shown in Figs. 2 and 6 carry balancing weights and this is essential for smooth running of the apparatus. It can however be arranged to balance the arms 34 and 38 on the shaft 33 one against the other by mounting the arm 38 on the shaft 33 so that it extends in the opposite direction to that of the arm 34. The shaft 39 carrying the disc 40 must then be offset from the shaft 33 by the same amount as that shown in Fig. 2 but in the opposite direction. It will readily be apparent that in this case also the pin 35 is in a position to move the arm 33 with maximum speed when the pin 41 is in a position to move the arm 38 at maximum speed.

Referring now to Fig. 9, which shows an alternative arrangement of the apparaus shown in Fig. 2, the cam 29 which is mounted on the camshaft 30 is in a position to impart a downward movement to the film engaging member 25. The arm 32 which is mounted on the other end of the camshaft 30 extends radially from the camshaft 30 in the opposite direction to that of the cam 29. The shaft 33 carrying the arm 34 is offset from the shaft 30 by the same amount as the shaft 33 shown in Fig. 2 but in the opposite direction to that shown in Fig. 2 so that the pin 35 on the arm 34 is in a position to move the arm 32 at maximum speed in the position shown, that is to say when the cam 29 is in a position to move the film engaging member downwards. The arm 38 mounted on the other end of the shaft 33 extends radially from the shaft 33 as in Fig. 2 but in the opposite direction to that of the arm 34. The disc 40 carrying the pin 41 which engages in the slit in the arm 38 is mounted on the shaft 39. The shaft 39 is offset from the shaft 33 by the same amount as the shaft 39 in Fig. 2 and in a direction such that the pin 41 is in a position to move the arm 38 at maximum speed when the pin 35 is in a position to move the arm 32 at maximum speed.

The shaft 53″ carrying the camwheel 53, which is of the kind shown in Figs. 5a and 5b, is driven by the camshaft 30 through the reduction gears 30′ and 53′.

The operation of the apparatus shown in Fig. 9 is essentially the same as that of the apparatus shown in Fig. 2. The need for balancing weights for the arms 32, 34 and 38 is however avoided.

Figure 10:
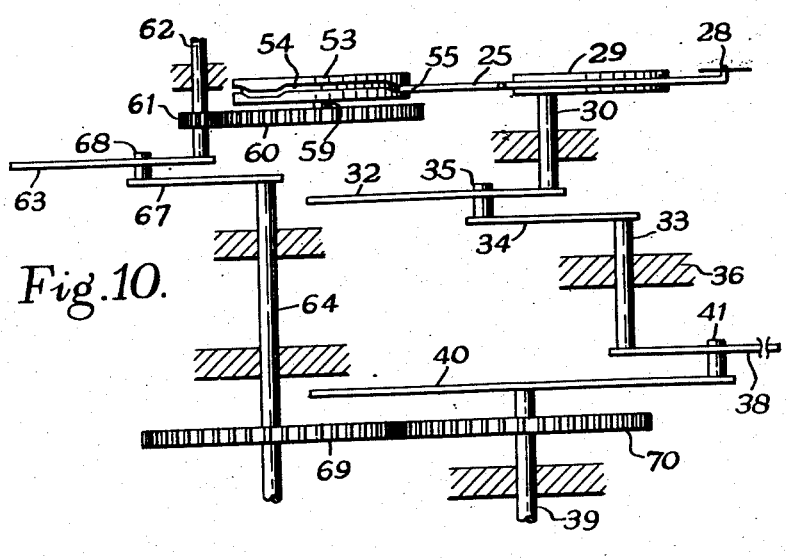
Fig. 10 is a diagrammatic plan view of yet another embodiment of the invention.

Referring now to Fig. 10, which shows an alternative arrangement of the apparatus shown in Fig. 6, the cam 29 is in a position to impart a downward movement to the film engaging member 25. The arm 32 mounted on the other end of the camshaft 30 extends radially from the camshaft 30 in the opposite direction to that of the cam 29. The shaft 33 is offset from the camshaft 30 in the opposite direction to that shown in Fig. 6 in order that the pin 35 on the arm 34 is in a position to move the arm 32 at maximum speed when the cam 29 is in a position to move the film engaging member 25 downwards. The arm 38 on the other end of the shaft 33 extends radially from the shaft 33 in the opposite direction to that of the arm 34. The shaft 39 carrying the disc 40 is offset from the shaft 33 in a direction such that the pin 41 on the disc 40 is in a position to move the arm 38 at maximum speed when the pin 35 is in a position to move the arm 32 at maximum speed. The positions shown in Fig. 10 are those at which maximum speed is imparted to the arms 32 and 38.

The camwheel 53, which is of the kind shown in Figs. 8a and 8b, is provided with an auxiliary drive substantially as described with reference to Fig. 6, the auxiliary drive comprising gears 69 and 70, shaft 64 carrying the arm 57 on which is mounted the pin 68, the shaft 62 carrying the arm 63 with the slit therein, reduction gears 60 and 61 having a reduction ratio of 1:5, and the shaft 59 carrying the camwheel 53.

The operation of the apparatus shown in Fig. 10 is essentially the same as that described with reference to Fig. 6. The need for balancing weights is however avoided in this arrangement.

It is to be noted that the pull-down interval can be varied by adjusting the position of the support 36 which carries the shaft 33.

It will be appreciated that cinematographic film traction apparatus according to this invention may equally well be employed in conjunction with television apparatus for recording televised pictures directly on to cinematographic film. Film on which the televised pictures are to be recorded is fed through the gate in the manner hereinbefore described and the scanning light beam from the "flying spot" scanner, is modulated in intensity in accordance with the transmitted picture signals.

I claim:

1. A film feed device adapted to feed cinematographic film through a film gate with a step-by-step motion comprising, a film engaging member; driving means to cause the film engaging member to move the film through the gate with the said step-by-step motion, a first coupling device including a driving and a driven member, the driving member being coupled to the driven member in such a manner that the driving member when moving at constant speed moves the driven member at a speed which varies continuously between a maximum and a minimum value, and the driven member being coupled to the driving means of the film feed device in such a manner that the driven member when moving at maximum speed is in a position to cause the film engaging member of the film feed device to move the film in the film gate, and a further coupling device including a driving and a driven member, the driving member of the further device being coupled to the driven member thereof in such a manner that the driving member of the further device when moving at constant speed moves the driven member of the further coupling device at a speed which varies continuously between a maximum and a minimum value, the driven member of the further device being coupled to the driving member of the first coupling device in such a manner that the driven member of the said further device moves the driving member of the first coupling device at maximum speed when the latter member is in a position to move the driven member of the first coupling device at substantially maximum speed, said driving means of the film feed device being of the kind adapted to be driven by rotatable means, the driven member of the said first coupling device being mounted for rotation and having an elongated guide part extending in a general direction radially of the axis of rotation thereof, the driving member of the first coupling device being mounted for rotation about an axis parallel to but displaced from the axis of rotation of the driven member of the first coupling device and having mounted thereon at a predetermined distance from the axis of rotation thereof a follower part which engages with and is constrained to move along the guide part of the driven member of the first coupling device.

2. Apparatus according to claim 1, wherein the predetermined distance between the axis of rotation of the driving member of the first coupling device and the follower part thereon is greater than the distance between the axes of rotation of the driving and driven members of the said first coupling device.

3. Apparatus according to claim 1, wherein the driven member of the further coupling device is mounted for rotation and is provided with an elongated guide part extending in a general direction radially of the axis of rotation thereof, and wherein the driving member of the further coupling device is mounted for rotation about an axis parallel to but displaced from the axis of rotation of the driven member of the further coupling device and has mounted thereon at a predetermined distance from the axis of rotation thereof a follower part which engages with and is constrained to move along the guide part of the driven member of the further coupling device.

4. Apparatus according to claim 3, wherein the predetermined distance between the axis of rotation of the driving member of the further coupling device and the follower part thereon is greater than the distance between the axes of rotation of the driving and driven members of the said further coupling device.

5. A film feed device adapted to feed cinematographic film through a film gate with a step-by-step motion, comprising, a film engaging member, reciprocating means for imparting a reciprocatory motion to the film engaging member, engaging and disengaging means for moving the film engaging member into and out of engagement with the film, the two motions being so related to one another that, in operation, the film engaging member when brought into engagement with the film executes a movement causing the film to move in the desired direction through the film gate, a first coupling device including a driving and a driven member, the driving member being coupled to the driven member in such a manner that the driving member when moving at constant speed moves the driven member at a speed which varies continuously between a maximum and a minimum value, and the driven member being coupled to the reciprocating means of the film feed device in such a manner that the driven member when moving at maximum speed is in a position to cause the film engaging member of the film feed device to move the film in the film gate, and an auxiliary coupling device coupled to the driving member of the engaging and disengaging means, the auxiliary coupling device including a driving and a driven member, the driving member of the auxiliary coupling device being coupled to the driven member of the auxiliary coupling device in such a manner that the driving member of the auxiliary coupling device when moving at constant speed moves the driven member thereof at a speed which varies continuously between a maximum and a minimum value, the driven member of the auxiliary device being coupled to the said engaging and disengaging means in such a manner that the driven member of the auxiliary device causes the said engaging and disengaging means to move at maximum speed when the latter member is in a position to cause the film engaging member to engage the film.

6. Apparatus according to claim 14, wherein the said engaging and disengaging means is adapted to be driven by rotatable means, wherein the driven member of the auxiliary coupling device is mounted for rotation and is provided with an elongated guide part extending in a general direction radially of the axis of rotation thereof, and wherein the driving member of the auxiliary coupling device is mounted for rotation about an axis parallel to but displaced from the axis of rotation of the driven member of the auxiliary coupling device and has mounted thereon at a predetermined distance from the axis of rotation thereof a follower part which engages with and is constrained to move along the guide part of the driven member of the auxiliary coupling device.

7. Apparatus according to claim 6, wherein the predetermined distance between the axis of rotation of the driving member of the auxiliary coupling device and the follower part thereon is greater than the distance between the axes of rotation of the driving and driven members of the auxiliary coupling device.

8. Apparatus according to claim 7 wherein the engaging and disengaging means comprises a rotatable cam wheel having a peripheral contour, the film engaging member engaging said contour and being mounted for rocking movement about an axis which in operation is arranged to be substantially parallel to the direction of movement of the film in the film gate.

9. Cinematographic film traction apparatus according to claim 7, wherein the reciprocating means of the film feed device comprises a rotatable cam, the film engaging member engaging said cam and being mounted for sliding movement in the direction of movement of film in the film gate.

10. Apparatus according to claim 5, wherein the said engaging and disengaging means is adapted to be driven by rotatable means, wherein the driven member of the auxiliary device is mounted for rotation and is provided with an elongated guide part extending in a general direction radially of the axis of rotation thereof, and wherein the driving member of the auxiliary device is mounted for rotation about an axis parallel to but displaced from the axis of rotation of the driven member of the auxiliary device and has mounted thereon at a predetermined distance from the axis of rotation thereof a follower part which engages with and is constrained to move along the guide part of the driven member of the auxiliary device.

11. Apparatus according to claim 10, wherein the predetermined distance between the axis of rotation of the driving member of the auxiliary device and the follower part thereon is greater than the distance between the axes of rotation of the driving and driven members of the auxiliary device.

12. Apparatus according to claim 11, wherein the reciprocating means of the film feed device comprises a rotatable cam, the film engaging member engaging said cam and being mounted for sliding movement in the direction of movement of film in the film gate.

13. Apparatus according to claim 12, wherein the engaging and disengaging means comprises a rotatable cam wheel having a peripheral contour, the film engaging member engaging said contour and being mounted for rocking movement about an axis which in operation is arranged to be substantially parallel to the direction of movement of the film in the film gate.

14. Apparatus according to claim 5, comprising a further coupling device including a driving and a driven member, the driving member of the further device being coupled to the driven member thereof in such a manner that the driving member of the further device when moving at constant speed moves the driven member of the further coupling device at a speed which varies continuously between a maximum and a minimum value, the driven member of the further device being coupled to the driving member of the first coupling device in such a manner that the driven member of the said further device moves the driving member of the first coupling device at maximum speed when the latter member is in a position to move the driven member of the first coupling device at substantially maximum speed.

15. Apparatus according to claim 14, wherein the reciprocating and the engaging and disengaging means are each adapted to be driven by rotatable means, and wherein the driven member of each coupling device is mounted for rotation and is provided with an elongated guide part extending in a general direction radially of the axis of rotation thereof, and wherein the driving member thereof is mounted for rotation about an axis parallel to but displaced from the axis of rotation of the driven member and has mounted thereon at a predetermined distance from the axis of rotation thereof a follower part which engages with and is constrained to move along the guide part of the driven member.

16. Apparatus according to claim 15, wherein the predetermined distance between the axis of rotation of the driving member and the follower part thereon of each coupling device is greater than the distance between the axes of rotation of the driving and driven member of the coupling device.

17. Apparatus according to claim 16, wherein the reciprocating means of the film feed device comprises a rotatable cam, the film engaging member engaging said cam and being mounted for sliding movement in the direction of movement of film in the film gate.

18. Apparatus according to claim 17, wherein the engaging and disengaging means comprises a rotatable cam wheel having a peripheral contour, the film engaging member engaging said contour and being mounted for rocking movement about an axis which in operation is arranged to be substantially parallel to the direction or movement of the film in the film gate.

References Cited in the file of this patent

UNITED STATES PATENTS

| | | |
|---|---|---|
| 1,480,864 | Reed | Jan. 15, 1924 |
| 2,475,622 | Kuehn | July 12, 1949 |
| 2,712,771 | Isom | July 12, 1955 |

FOREIGN PATENTS

| | | |
|---|---|---|
| 894,351 | Germany | Oct. 22, 1953 |